United States Patent [19]

Eishima et al.

[11] Patent Number: 4,665,322
[45] Date of Patent: May 12, 1987

[54] UNINTERRUPTIBLE POLYPHASE AC POWER SUPPLY

[75] Inventors: Yoshinori Eishima; Yasuhiro Kawata, both of Saga, Japan

[73] Assignee: Nishimu Electronics Industries, Co., Ltd., Fukukoa, Japan

[21] Appl. No.: 792,498

[22] Filed: Oct. 29, 1985

[30] Foreign Application Priority Data

Nov. 5, 1984 [JP] Japan .......................... 59-166485[U]

[51] Int. Cl.$^4$ .......................... H02M 7/42; H02J 9/00
[52] U.S. Cl. ...................................... 307/66; 323/214; 323/215; 363/2; 363/71
[58] Field of Search ....................... 307/20, 23, 31, 46, 307/66, 43, 45, 64, 82, 83; 323/206, 207, 212, 214, 215; 363/2, 71, 137

[56] References Cited

U.S. PATENT DOCUMENTS

| | | | |
|---|---|---|---|
| 3,448,366 | 6/1969 | Goff | 363/2 X |
| 3,873,846 | 3/1975 | Morio et al. | 307/23 |
| 4,238,688 | 12/1980 | Boettcher, Jr. et al. | 307/20 |
| 4,238,691 | 12/1980 | Ebert | 307/66 |
| 4,531,085 | 7/1985 | Mesenhimer | 323/214 |
| 4,556,802 | 12/1985 | Harada et al. | 307/66 |

OTHER PUBLICATIONS

Article entitled "Magnetic Balanced Phase Shifter for Polyphase Supply", IEEE Transactions on Magnetics, vol. Mag. 10, No. 3, Sep. 1974, pp. 973-975.
Article entitled "A 15 kVA, Three-Phase Triport-A New Approach To UPS", Charles W. Boettcher, Jr., Bell Telephone Laboratories, Whippany, N.J. 07981, 1978 IEEE, pp. 59-65.

Primary Examiner—William M. Shoop, Jr.
Assistant Examiner—Bentsu Ro
Attorney, Agent, or Firm—Kinney & Lange

[57] ABSTRACT

An uninterruptible polyphase AC power supply equalizes an electric power taken out from a polyphase AC power source, even if unbalanced load is connected to output. The uninterruptible AC power supply comprizes a polyphase balanced phase shifter generating one control signal in synchronous with one phase of the AC power source and other control signals each having a prescribed phase difference with respect to said former control signal, a phase comparator comparing phases of said respective control signals with those of output voltage of the uninterruptible AC power supply to output correction signals whch minimize the phase difference between them, a plurality of phase shifters for signal phase to which are respectively supplied said control signals as well as said correction signal in the corresponding phases to generate invertor control signals in the corresponding phases, and a means for supplying the invertor control signals being the outputs of said respective phase shifters for single phase to the invertors in the corresponding phases.

8 Claims, 8 Drawing Figures (A)

(B)

UNINTERRUPTIBLE POLYPHASE AC POWER SUPPLY

BACKGROUND OF THE INVENTION

1. Field of the Invention

This invention relates to an uninterruptible polyphase AC power supply, and more particularly to a synchronous uninterruptible polyphase AC power supply provided with a polyphase balanced controller which can equalize such electric power taken out from a polyphase AC power source, even if unbalanced load is connected to output.

2. Description of the Prior Art

FIG. 2 is a block diagram showing a synchronous uninterruptible three-phase AC power supply wherein reference characters 1A–1C designate AC power sources, a battery 3 is charged by a rectifier/charger 2. A three-phase balanced phase shifter 7 synchronizes always with one phase (A phase in case of FIG. 2) of an AC power source so that such three phase control signals a–c each phase difference of which is fixed at 120° on the basis of said A-phase are supplied to invertors 4A–4C for the respective phases as their respective driving signals.

To each of the invertors 4A–4C is supplied electric power from the battery 3, and further the respective invertors are driven by said phase control signals a–c from the three-phase balanced phase shifter 7 to generate balanced three phase alternating current.

Outputs of the invertors 4A–4C are supplied to each first input winding of single phase three-winding transformers 5A–5C corresponding respectively to said invertors. To each second input winding of the single phase three-winding transformers 5A–5C is supplied also electric power from the AC power sources 1A–1C, whilst each third output winding of them is connected to loads 6A–6C.

In this case, when each output voltage of the invertors 4A–4C is kept to be in phase with the load voltage generated in each output winding of the three-winding transformers 5A–5C, in other words, when phases of the three phase control signals a–c are rotated so as to minimize the input current to the respective invertors 4A–4C, i.e., the output of a DC detector 10, the respective invertors 4A–4C come into stand-by operating condition.

In this condition, the invertors 4A–4C do not supply the electric power to the loads 6A–6C, but all the load electric power is supplied from the AC power sources 1A–1C.

When the AC power sources are stopped, synchronizing signal is not supplied to the three-phase balanced phase shifter 7, however, it oscillates independently by its internal oscillator (not shown) so that the respective invertors 4A–4C are continuously driven and controlled without any interruption.

In these circumstances, electric power is supplied continuously from the battery 3 to the loads 6A–6C through the invertors 4A–4C and the single phase three-winding transformers 5A–5C, i.e., their output windings.

FIG. 3 is an equivalent circuit diagram wherein the block diagram of FIG. 2 is simplified, and FIGS. 4(A) and 4(B) are vector diagrams showing the voltage in each phase due to currents flowing through the respective sections in FIG. 3. FIGS. 4(A) and 4(B) illustrate both of the case where the loads 6A–6C balance with each other and the case where the load 6A of A-phase is 100%, whilst the loads of B- and C-phases are 0%, respectively.

As is apparent from FIGS. 4(A), when the loads 6A–6C balance with each other, all the respective phase differences of output voltages $v_a$–$v_c$ as well as output voltages $V_{1A}$–$V_{1C}$ of the invertors 4A–4C are maintained at 120°. However, when an unbalanced load is connected, the current in each phase becomes unbalanced so that there arise phase differences due to equivalent reactances of the single phase three-winding transformers 5A–5C. Thus, as illustrated in FIG. 4(B), phase differences between the respective phases of three-phase output voltages, i.e., load voltages $v_a$–$v_c$ are not maintained at 120°, respectively, so that unbalanced state appears.

As is easily understood from FIG. 2–FIGS. 4 (A), (B) as well as the description relating thereto, since almost all of the above-mentioned unbalanced load currents are supplied from the AC power sources 1A–1C, there is such a problem that the AC power sources are adversely affected.

SUMMARY OF THE INVENTION

It is the first object of the present invention to provide an uninterruptible AC power supply in which such problem that the AC power source is adversely affected by unbalanced load may be eliminated, besides it is possible to balance phases of three-phase output voltage or load voltage.

The second object of the present invention is to provide an uninterruptible AC power supply provided with such three-phase balanced phase shifter in which the number of parts can be reduced to realize lowering of manufacturing cost as well as improvement of reliability by the application of saturable reactors to a three-phase balanced phase shifter or phase shifters for single phase.

A characteristic feature of the present invention resides in that a three-phase balanced phase shifter being connected to a synchronous oscillator, phase shifters for single phase, and a phase comparator are combined with each other to obtain invertor control signals.

Furthermore another characteristic feature of the present invention resides in the construction of the aforesaid phase shifters by utilizing saturable transformers.

DETAILED DESCRIPTION OF THE INVENTION

The present invention will be described in detail hereinbelow by referring to the accompanying drawings.

Figure 1:
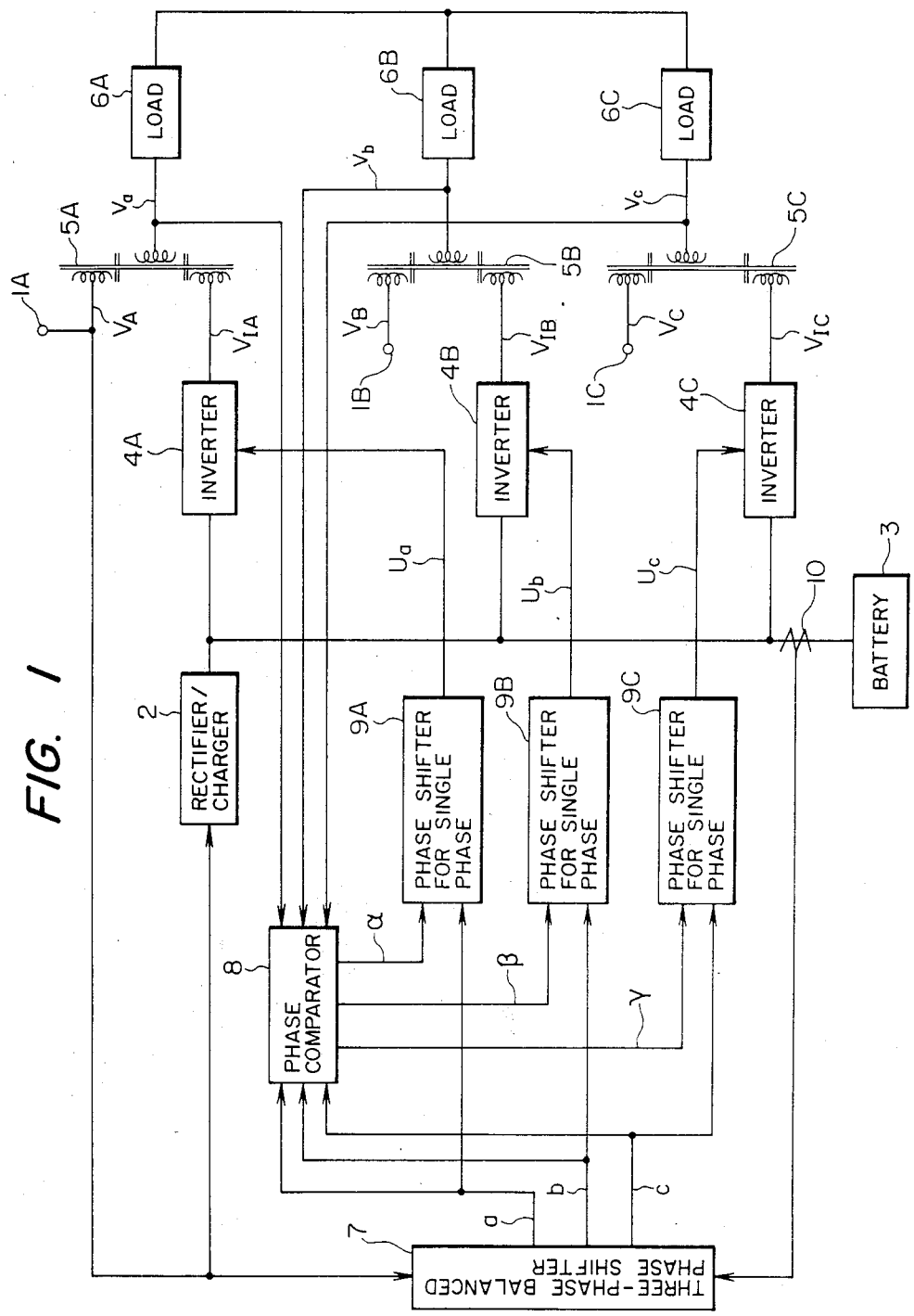
FIG. 1 is a schematic block diagram illustrating an example of the present invention.
Figure 2:
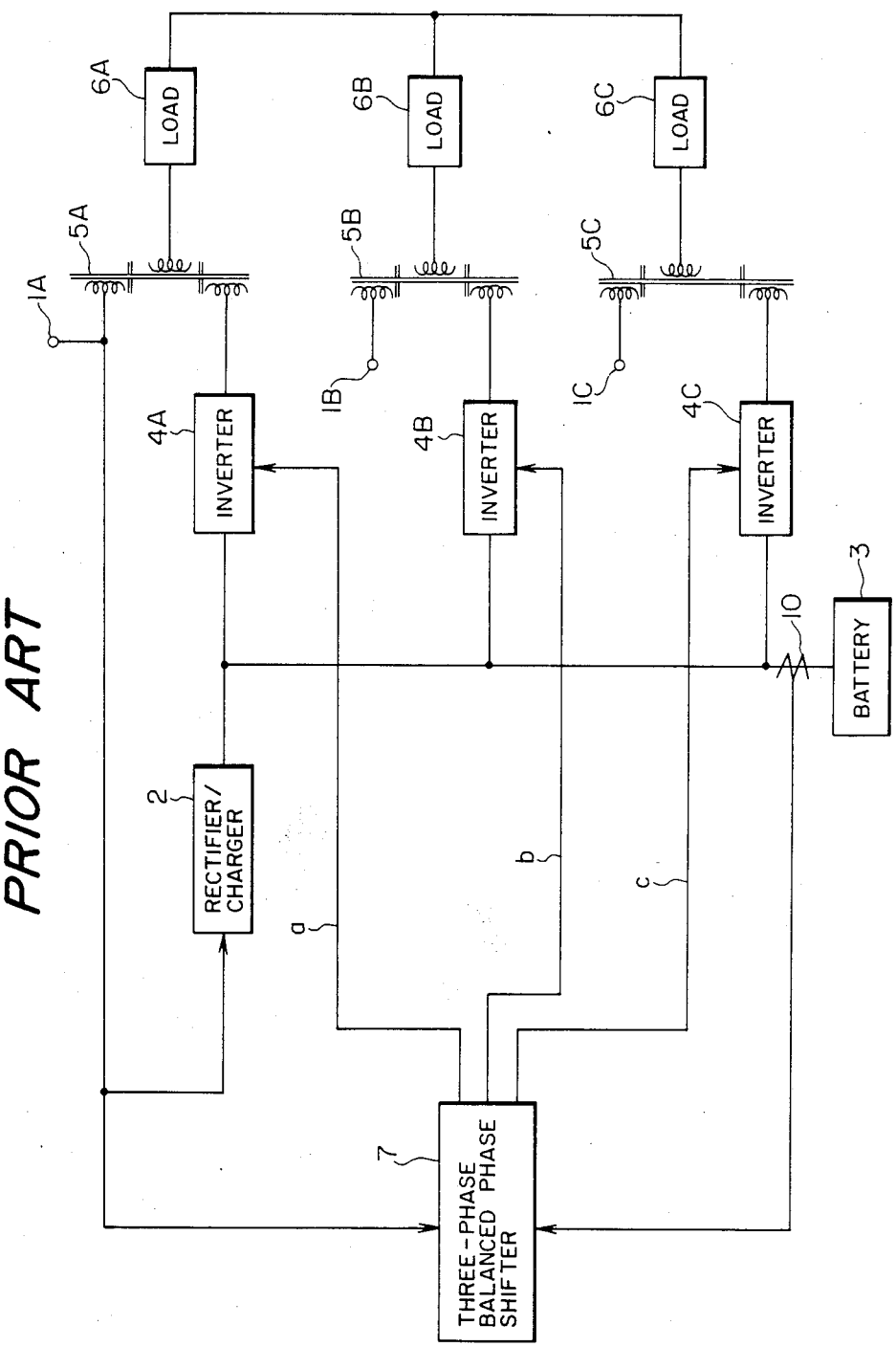
FIG. 2 is a block diagram illustrating an example of a conventional synchronous uninterruptible polyphase AC power supply wherein single phase three-winding transformers 5A–5C are used.
Figure 3:
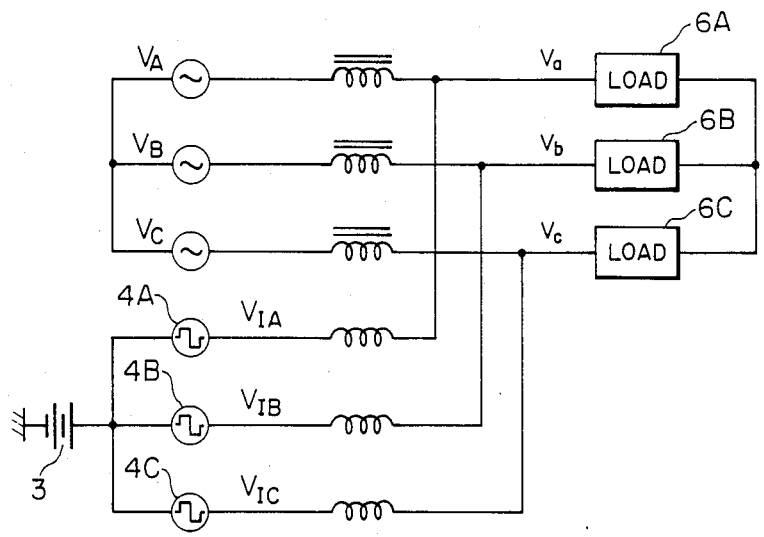
FIG. 3 is an equivalent circuit diagram wherein the circuit of FIG. 2 is simplified.

In FIG. 1, three phase control signals a-c being outputs of a three-phase balanced phase shifter 7 are supplied to a phase comparator 8 and phase shifters 9A-9C for single phase, respectively. To the phase comparator 8 are also supplied phase signals of the output voltages in respective phases, i.e., output voltages $v_a$-$v_c$ of single phase three-winding transformers 5A-5C.

The phase comparator 8 compares, as mentioned hereunder, said phase control signals a-c with phases of the output voltages $v_a$-$v_c$ in the respective phases to supply DC voltage correction signals $\alpha$, $\beta$, and $\gamma$ which minimize these phase differential angles to the phase shifters 9A-9C for single phase. As described hereinbelow, the phase shifters 9A-9C for single phase generate invertor control signals or driving signals $U_a$-$U_c$ wherein each phase shift is adjusted in the every phases on the basis of said phase control signal a-c and said correction signals $\alpha$-$\gamma$.

Figure 5:
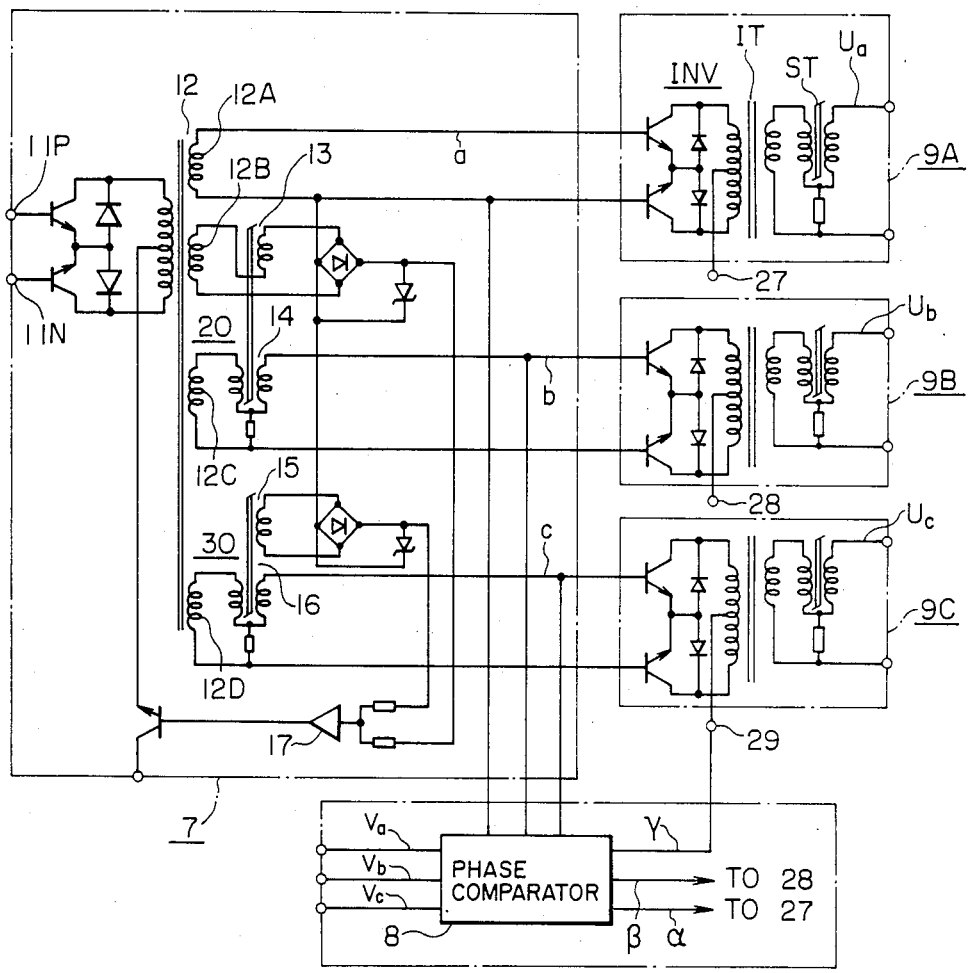
FIG. 5 is a detailed block diagram showing an essential part of an embodiment according to the present invention.

FIG. 5 illustrates a specific example of construction of the three-phase balanced phase shifter 7 and the phase shifters 9A-9C for each single phase in an embodiment of the present invention wherein saturable transformers are used.

In FIG. 5, a first trigger signal which has the same frequency (50 Hz or 60 Hz) as that of AC power source and is synchronized with one (e.g., A-phase) of three phases of the AC power source is supplied to a first input terminal 11P, whilst to a second input terminal 11N is supplied a second trigger signal having the opposite phase to that of said first trigger signal.

As a result, such alternating current or square wave voltage being in synchronous with said one (e.g., A-phase) of the phases is generated in each of secondary windings 12A-12D of a transformer 12 of the three-phase balanced phase shifter 7. The AC voltage induced in the secondary winding 12A is supplied to the phase shifter 9A for single phase without any modification as the phase control signal a. Such AC voltages induced in the other secondary windings 12B-12D are supplied to first and second phase shifters 20 and 30 which are composed of saturable transformers 13 and 14 as well as saturable transformers 15 and 16, respectively.

In the above case, saturation times or characteristics of the respective saturable transformers 13-16 are set in such that the control signals b and c having each phase difference $\pm 120°$ with respect to said control signal a are produced from said saturable transformers 14 and 16. These control signals b and c are supplied to the phase shifters 9B and 9C for single phase, respectively.

Reference numeral 17 in FIG. 5 designates an integrator for feedback.

On one hand, as is apparent from FIGS. 1 and 5, phases of the voltages $v_a$-$v_c$ at three-phase loads 6A-6C are always supervised by a phase comparator 8 on the basis of phases of the output voltage in the three-phase balanced phase shifter 7 or the phase control signals a-c, so that DC voltages (correction signals) $\alpha$-$\gamma$ in response to the respective phase differences are produced in the phase comparator 8. Such phase comparator is well known. Said DC voltages $\alpha$-$\gamma$ are inputted to control terminals 27-29 of the phase shifters 9A-9C for single phase, as the correction signals, respectively.

The respective phase shifters 9A-9C for single phase generate the invertor control signals $U_a$-$U_c$ corresponding to said DC correction signals $\alpha$-$\gamma$ and the rectangular phase control signals a-c to control output voltage phases in the corresponding invertors 4A-4C, respectively.

The details of controlling output voltage phase will be more specifically described in respect of the invertor 4A.

In FIG. 5, said phase control signal a becomes a drive signal of an invertor INV contained in the phase shifter 9A for single phase. As is well known, a square wave generated in the output winding of an invertor transformer IT is in phase with the drive signal. When value of the DC voltage correction signal $\alpha$ supplied to the control terminal 27 varies, amplitude of said output square wave being the input on the primary side of a saturable transformer ST changes. Thus, phase of the square wave-like invertor control signal $U_a$ varies dependent upon characteristics of the saturable transformer ST. As is understood from FIG. 1, since the control signal $U_a$ becomes drive signal of the invertor 4A, output voltage phase of the invertor 4A is controlled in response to value of the DC voltage correction signal $\alpha$, i.e., phase difference of load voltage $V_a$ with respect to the phase control signal a.

If it is assumed that the loads 6A-6C in the respective phases are balanced, each of phase differences of the respective corresponding phases between the load voltages $v_a$, $v_b$, and $v_c$ and the AC power source voltages $V_A$, $V_B$, and $V_C$ (for example, the phase between $V_A$ and $V_a$) is equal to each other in respect of these three phases.

Hence the three-phase balanced phase shifter 7 shifts (delays or advances) phases of the output voltages $V_{IA}$-$V_{IB}$ in the invertors 4A-4C connected to the respective phases so that they coincide with phases of the load voltages $v_a$-$v_c$ while maintaining each phase difference between the respective three phases at 120°.

In this condition, the output electric powers of the respective invertors 4A-4C become zero—, i.e., the respective invertors come to stand-by state, so that all the electric powers consumed in the loads 6A-6C are supplied from the AC power sources 1A-1C.

It is true, but such stand-by state is usually realized, in practical operation, by rotating phases of the respective phase control signals a-c from the three-phase balanced phase shifter 7 so as to minimize DC input current to the respective invertors 4A-4C (which is detected by a DC detector 10 in FIG. 1) instead of coincidence of output voltage phase of the respective invertors 4A-4C with the load voltage phases.

Figure 4:
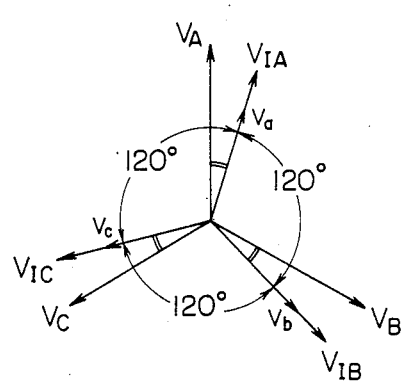
FIGS. 4(A) and 4(B) are vector diagrams each showing a phase relationship of voltage in each section which are derived from each current flowing through the equivalent circuit of FIG. 3.
Figure 4:
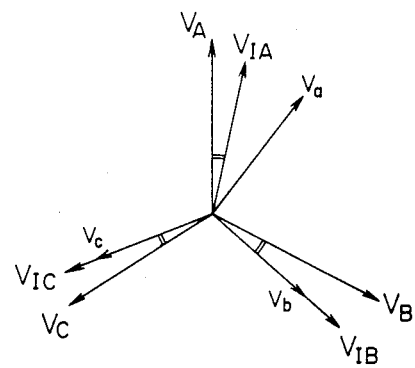

Next, in the case where loads of the respective phases differ from one another and become unbalanced loads, each phase difference between phases of the AC input voltages $V_A$-$V_C$ and the respective phases of the load voltages $v_a$-$v_c$ corresponding thereto varies dependent upon the magnitude of load current. In other words, the larger load current brings about the larger phase difference, and in the case where such load current is zero, said phase difference becomes zero (see FIG. 4(B)).

Thus, the phase differences between three phases of the load voltages $v_a$-$v_c$ are not maintained at 120°, respectively, but there are considerable differences among said phase differences. As a result, the interphase voltage becomes also unbalanced. In this case, as mentioned above, the three-phase balanced phase shifter 7 operates to shift phases of the respective phase control signals a-c as well as those of the output voltages $V_{1A}$-$V_{1C}$ of the respective invertors 4A-4C to such phase position at which the sum of input currents to the respective invertors 4A-4C is minimized.

Hence such load currents responding to the magnitude of load unbalance (in other words, being in response to the magnitude of phase difference due to equivalent reactance) are supplied from the invertors 4A-4C, respectively. More specifically, for example, a certain invertor supplies electric power to the load, but another invertor is in such state where electric power is conversely supplied thereto from the commercial AC power source.

As a result, a certain degree of balance for load is realized with respect to AC power source, but complete balance of load cannot be realized with respect to the AC power source by only such measures as described above.

As a countermeasure, in the present invention, such complete balance of load is effected with respect to AC power source by further combining, as shown in FIGS. 1 and 5, the phase shifters 9A-9C for single phase with the phase comparator 8.

Namely, phases of the load output voltages $v_a$-$v_c$ are always compared with phases of output of the three-phase balanced phase shifter 7, i.e., the three phase control signals a-c in the phase comparator 8. In this connection, driving phases of the invertors 4A-4C are further controlled individually in the every phases in such that the phase difference is minimized.

Thus, such electric powers supplied from AC power source in all phases can be equalized one another even in case of unbalanced load, and accordingly each phase difference angle of the load output voltage can be maintained at 120°.

Figure 6:
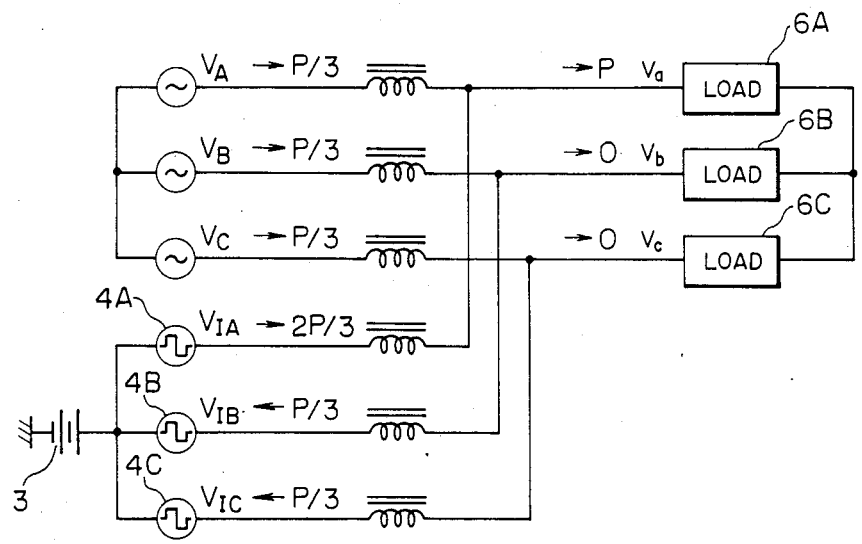
FIG. 6 is an equivalent circuit diagram wherein the circuit of FIG. 5 is simplified.
Figure 7:
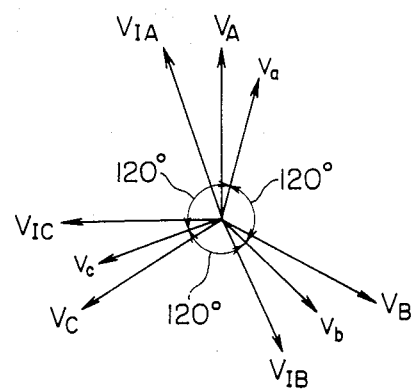
FIG. 7 is a vector diagram showing a phase relationship of voltage in each section and phase in the circuit of FIG. 5.

FIG. 6 illustrates an example of the flow of electric power in case of unbalanced load, and FIG. 7 is a vector diagram illustrating the case of FIG. 6 wherein it is assumed that power consumption P of one 6A of loads is P, and that of other loads 6B and 6C is O. An invertor 4A supplies electric power 2P/3 to the load 6A, but the other invertors 4B and 4C receive electric power P/3 from B- and C-phases of AC power source to the contrary.

Consequently, the load 6A is supplied from electric power P/3 as well as electric power 2P/3 from A-phase of AC power source and the invertor 4A, respectively, so that the load 6A can consume electric power P as a whole. On one hand, considering the AC power source, since the respective phases A-C supply electric powers being equal one another in every P/3, complete balance can be attained.

In the above description, while the case where the present invention is applied to an uninterruptible three-phase AC power supply has been described, it will be apparent that this invention can be generally applied to any other uninterruptible polyphase AC power supplies.

As is understood from the above description, the present invention involves the following advantages.

(1) Even if three-phase unbalanced load is connected to the uninterruptible AC power supply, the three-phase output load voltage does not become unbalanced, and balanced three-phase voltage can always be maintained.

(2) As a result of said Par. (1), balanced load current is taken out from the respective phases of AC power source, and economical power receiving facilities can be realized, besides free load distribution may be realized.

(3) Phase shifters such as balanced phase shifter, phase shifter for single phase and the like are not composed of transistors, logical elements and the like as in conventional ones, but composed of saturable transformers having higher stability than that of semiconductor element with respect to surge, induction, temperature change and the like, besides involving complexly various functions such as integration, addition, comparison, insulation and the like in the present invention, so that:

(a) the circuit construction becomes simple, and the number of required parts decreases;

(b) the reliability is significantly improved, and decrease in cost can be realized, and further;

(C) the stability with respect to temperature change and external disturbance such as noise, induction, mechanical shock or the like can be improved.

(4) Since such phase shifter composed of saturable transformers have inductance component being extreamly larger than that of a conventional phase shifter composed of semiconductors, response speed of feedback loop is very slow, and width of phase deviation is also remarkable. However, since the response is not sensitive, it is rather suitable for controlling such high electric power of 50-60 Hz.

It is true, but there is such a necessity in connection with the above description that down time (time generating no square wave) of square wave for controlling the conduction of transistors, thyristors and the like which are, for example, connected in bridge to compose an invertor must be set to around 100 μsec being about 10 times larger than that of about 10 μsec in a conventional semiconductor construction.

What is claimed is:

1. An uninterruptible polyphase AC power source comprises:
   a polyphase load;
   a plurality of inverters, one for each phase of said polyphase load;
   a plurality of single phase three-winding transformers, each first winding of said three-winding transformers being connected to one phase of said polyphase AC power source, each second winding being connected to one of said plurality of intervers, and each third winding being connected to one phase of said polyphase load;
   a polyphase balanced phase shifter for generating at least one control signal in synchronism with one phase of said polyphase AC power source, and generating other control signals, each of said other control signals having a predetermined phase difference with said at least one control signal;
   a phase comparator for comparing and minimizing phase differences between the control signals and the respective output voltages of the third winding of said plurality of single phase three-winding transformers, and to output a plurality of phase correction signals;
   a plurality of single-phase shifters, each of said single-phase phase shifters responsive to one of said control signals and a corresponding one of said phase correction signals to generate an inverter control signal, one for each phase of said polyphase load, and each phase of said inverter control signals being supplied to the respective one of said plurality of inverters to control said plurality of inverters.

2. An uninterruptible polyphase AC power supply as claimed in claim 1 wherein said first and second windings are each coupled to said third windings by magnetic shunts.

3. An uninterruptible, multiple phase, alternating current power supply for providing power from a multiple phase power source to electrical loads where there can be one of said electrical loads for each power supply output phase, said power supply comprising:
   a plurality of inverters, one for each power supply output phase;
   a plurality of multiple winding transformers, one for each power supply output phase, each such multiple winding transformer having multiple windings thereon including first, second and third windings, each said first windings of each of said multiple winding transformers being adapted for connection to an alternative phase of said multiple phase power source, each said second winding of each of said multiple winding transformers being connected to an alternative one of said plurality of inverters, and each said third winding of each of said multiple winding transformers being adapted for connection to a selected electrical load;
   a multiple phase balanced phase shifter for generating control signals including a synchronous control signal which is in synchronism with any selected phase of said multiple phase power source to which said first windings are connected, and including related control signals where each of said related control signals have a predetermined phase difference with said synchronous control signal, said predetermined phase differences between said related control signals and said synchronous control signal being established by at least one saturable transformer;
   a phase comparator for comparing phase differences between said control signals and waveforms occurring on said third windings of said multiple winding transformers, said phase comparator providing a plurality of phase correction signals indicative of such phase differences; and
   a plurality of phase shifters, each of said phase shifters responsive to at least one of said control signals and at least one of said phase correction signals to generate an inverter operation signal with each of said inverter operation signals being provided to a corresponding one of said plurality of said inverters to control relative phases of waveforms provided by said plurality of inverters to that said second winding of said multiple winding transformer to which each is connected.

4. The apparatus of claim 3 wherein said inverter operation signal from each of said plurality of phase shifters is generated through use of at least one saturable transformer.

5. The apparatus of claim 4 wherein said first and second windings are each coupled to said third winding by magnetic shunts.

6. The apparatus of claim 3 wherein said first and second windings are each coupled to said third winding by magnetic shunts.

7. An uninterruptible, multiple phase, alternating current power supply for providing power from a multiple phase power source to electrical loads where there can be one of said electrical loads for each power supply output phase, said power supply comprising:
   a plurality of inverters, one for each power supply output phase;
   a plurality of multiple winding transformers, one for each power supply output phase, each such multiple winding transformer having multiple windings thereon including first, second and third windings, each said first winding of each of said multiple winding transformers being adapted for connection to an alternative phase of said multiple phase power source, each said second winding of each of said multiple winding transformers being connected to an alternative one of said plurality of inverters, and each said third winding of each of said multiple winding transformers being adapted for connection to an electrical load;
   a multiple phase balanced phase shifter for generating control signals including a synchronous control signal which is in synchronism with any selected phase of said multiple phase power source to which said first windings are connected, and including related control signals where each of said related control signals have a predetermined phase difference with said synchronous control signal;
   a phase comparator for comparing phase differences between said control signals and waveforms occurring on said third windings of said multiple winding transformers, said phase comparator providing a plurality of phase correction signals indicative of such phase differences; and
   a plurality of phase shifters, each of said phase shifters responsive to at least one of said control signals and at least one of said phase correction signals to generate an inverter operation signal through use of at least one saturable transformer with each of said inverter operation signals being provided to a corresponding one of said plurality of said inverters to control relative phases of waveforms provided by said plurality of inverters to that said second winding of said multiple winding transformer to which each is connected.

8. The apparatus of claim 7 wherein said first and second windings are each coupled to said third winding by a magnetic shunt.

* * * * *